United States Patent
Yanagawa

(10) Patent No.: US 7,565,561 B2
(45) Date of Patent: Jul. 21, 2009

(54) SYSTEM FOR CONTROLLING VOLTAGE SUPPLIED TO COMMUNICATION INTERFACE BETWEEN ENERGY-SAVING MODE AND NORMAL MODE THROUGH THE USED OF A RESISTOR UPON WHETHER EXTERNAL DEVICE IS CONNECTED

(75) Inventor: Katsuhiko Yanagawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 11/439,914

(22) Filed: May 24, 2006

(65) Prior Publication Data

US 2006/0271802 A1 Nov. 30, 2006

(30) Foreign Application Priority Data

May 26, 2005 (JP) ............................. 2005-154022

(51) Int. Cl.
*G06F 1/32* (2006.01)
(52) U.S. Cl. ....................................... 713/323; 713/310
(58) Field of Classification Search ................. 713/323, 713/310; 358/1.15
See application file for complete search history.

(56) References Cited

U.S. PATENT DOCUMENTS

2005/0050371 A1* 3/2005 Ono ........................... 713/300

FOREIGN PATENT DOCUMENTS

| JP | 2001-36785 A | 2/2001 |
|---|---|---|
| JP | 2002-178610 A | 6/2002 |
| JP | 2003-186653 A | 7/2003 |
| JP | 2003-266880 A | 9/2003 |
| JP | 2004-127188 A | 4/2004 |

\* cited by examiner

*Primary Examiner*—Thuan N Du
(74) *Attorney, Agent, or Firm*—Rossi, Kimms & McDowell, LLP

(57) ABSTRACT

An information processing apparatus which is in enhanced in operability. A printing apparatus (information processing apparatus) operates in a normal operation mode in which normal operation is enabled, or in an energy-saving mode in which power consumption is reduced. A USB host interface communicates with a USB device. When the printing apparatus is operating in the energy-saving mode, electric power is inhibited from being supplied to the USB host interface and an energy-saving block, and a microprocessor of a system LSI causes the printing apparatus to shift from the energy-saving state to the normal operation state when the USB device is connected to the USB host interface.

12 Claims, 5 Drawing Sheets

SYSTEM FOR CONTROLLING VOLTAGE SUPPLIED TO COMMUNICATION INTERFACE BETWEEN ENERGY-SAVING MODE AND NORMAL MODE THROUGH THE USED OF A RESISTOR UPON WHETHER EXTERNAL DEVICE IS CONNECTED

BACKGROUND OF THE INVENTION

1. Field of the Invention

The present invention relates to an information processing apparatus, a control method therefor, a program for implementing the method, and a storage medium storing the program.

2. Description of the Related Art

Conventionally, there has been proposed a printing apparatus that is operable when left unused over a predetermined time period, to shift from a normal operation mode in which printing and the like can be performed to an energy-saving mode in which power consumption is held low, so as to reduce power consumption when the printing apparatus is not in use. In such a printing apparatus, supply of electric power to a microprocessor controlling the printing apparatus and a communication controller controlling a communication unit is interrupted in the energy-saving mode.

Further, an information processing system has been proposed e.g. in Japanese Laid-Open Patent Publication (Kokai) No. 2004-127188, in which a printing apparatus operating in an energy-saving mode can be returned to a normal operation mode by user operation from a digital camera connected to the printing apparatus via a USB interface, so as to cause the printing apparatus to carry out printing.

However, the information processing system disclosed in Japanese Laid-Open Patent Publication (Kokai) No. 2004-127188 is incapable of causing the printing apparatus to return to the normal operation mode without the user operation from the digital camera. Therefore, if a USB memory or the like storing data to be printed is connected to the printing apparatus, the user is required to manually operate the operating section of the printing apparatus to return the printing apparatus to the normal operation mode in which print processing or the like is enabled, and then instruct the printing apparatus to carry out printing, from the operating section. Therefore, the operability of the printing apparatus is low.

SUMMARY OF THE INVENTION

It is an object of the present invention to provide an information processing apparatus which is enhanced in operability, a control method therefor, a program for implementing the method, and a storage medium storing the program.

To attain the above object, in a first aspect of the present invention, there is provided an information processing apparatus that operates in a normal operation state in which normal operation is enabled, or in an energy-saving state in which power consumption is reduced, comprising a communication unit adapted to communicate with an external device and supply electric power to the external device, a detection unit adapted to detect connection of the external device to the communication unit, a control unit adapted to control the information processing apparatus, and a power control unit adapted to control electric power to be consumed by the information processing apparatus, wherein the power control unit inhibits electric power from being supplied to the communication unit and the control unit when the information processing apparatus is operating in the energy-saving state, and causes the information processing apparatus to shift from the energy-saving state to the normal operation state when the external device is connected to the communication unit.

With the configuration of the information processing apparatus according to the present invention, when an external device is connected to the communication unit during operation of the information processing apparatus in the energy-saving state, the information processing apparatus is caused to shift from the energy-saving state to the normal operation state without supply of electric power from the external device, so that it is possible to improve the operability of the information processing apparatus.

Preferably, the power control unit causes electric power to be supplied to the communication unit when the information processing apparatus is in the normal operation state.

Preferably, the power control unit causes electric power to be supplied to the control unit when the information processing apparatus is in the normal operation state.

Preferably, an information processing apparatus further comprising a power supply line for supplying electric power to the communication unit, and the detection unit detects connection of the external device to the communication unit by detecting a voltage drop in the power supply line.

With the configuration of the preferred embodiment, the connection of an external device to the communication unit is detected by detecting a voltage drop in the power supply line for supplying power to the communication unit. Therefore, the information processing apparatus is capable of shifting from the energy-saving state to the normal operation state by detecting connection of an external device to the communication unit.

More preferably, an information processing apparatus further comprising a switch and a resistor provided in the power supply line in parallel with each other, and the switch interrupts power supply when the information processing apparatus is operating in the energy-saving state.

Preferably, an information processing apparatus comprising a printing unit adapted to print out data stored in the external device when the external device is connected to the communication unit.

Preferably, an information processing apparatus comprising a storage unit adapted to store data stored in the external device when the external device is connected to the communication unit.

Preferably, an information processing apparatus comprising a transmission unit adapted to transmit data stored in the external device to another apparatus when the external device is connected to the communication unit.

More preferably, the control unit and a communication control unit adapted to control the communication unit are provided on an identical chip.

Preferably, the communication unit is a host interface of a universal serial bus (USB).

More preferably, the external device is a USB memory.

Preferably, the communication unit is an IEEE 1394 interface.

Preferably, an information processing apparatus comprising a display unit adapted to display information on data stored in the external device when the external device is connected to the communication unit.

With the configuration of the preferred embodiment, information on data stored in an external device is displayed when the external device is connected to the communication unit. Therefore, it is possible to carry out printing or the like processing on image data stored in the external device, to thereby further enhance the operability of the information processing apparatus.

More preferably, the information on data stored in the external device is for selecting a process to be performed on the data.

Further preferably, the process to be performed includes printing of the data by a printing unit, storage of the data by a storage unit, and transmission of the data to another apparatus by a transmission unit.

To attain the above object, in a second aspect of the present invention, there is provided a method of controlling an information processing apparatus that operates in a normal operation state in which normal operation is enabled, or in an energy-saving state in which power consumption is reduced, and comprises a communication unit adapted to communicate with an external device and supply electric power to the external device, and a control unit, comprising a detection step of detecting connection of the external device to the communication unit, and a power control step of controlling electric power to be consumed by the information processing apparatus, wherein the power control step includes inhibiting electric power from being supplied to the communication unit and the control unit when the information processing apparatus is operating in the energy-saving state, and causing the information processing apparatus to shift from the energy-saving state to the normal operation state when the external device is connected to the communication unit.

To attain the above object, in a third aspect of the present invention, there is provided a program for causing a computer to execute a method of controlling an information processing apparatus that operates in a normal operation state in which normal operation is enabled, or in an energy-saving state in which power consumption is reduced, and comprises a communication unit adapted to communicate with an external device and supply electric power to the external device, and a control unit, the program comprising a detection module for detecting connection of the external device to the communication unit, and a power control module for controlling electric power to be consumed by the information processing apparatus, wherein the power control module inhibits electric power from being supplied to the communication unit and the control unit when the information processing apparatus is operating in the energy-saving state, and causes the information processing apparatus to shift from the energy-saving state to the normal operation state when the external device is connected to the communication unit.

To attain the above object, in a fourth aspect of the present invention, there is provided a storage medium storing a computer-executable program for causing a computer to execute a method of controlling an information processing apparatus that operates in a normal operation state in which normal operation is enabled, or in an energy-saving state in which power consumption is reduced, and comprises a communication unit adapted to communicate with an external device and supply electric power to the external device, and a control unit, the program comprising a detection module for detecting connection of the external device to the communication unit, and a power control module for controlling electric power to be consumed by the information processing apparatus, wherein the power control module inhibits electric power from being supplied to the communication unit and the control unit when the information processing apparatus is operating in the energy-saving state, and causes the information processing apparatus to shift from the energy-saving state to the normal operation state when the external device is connected to the communication unit.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
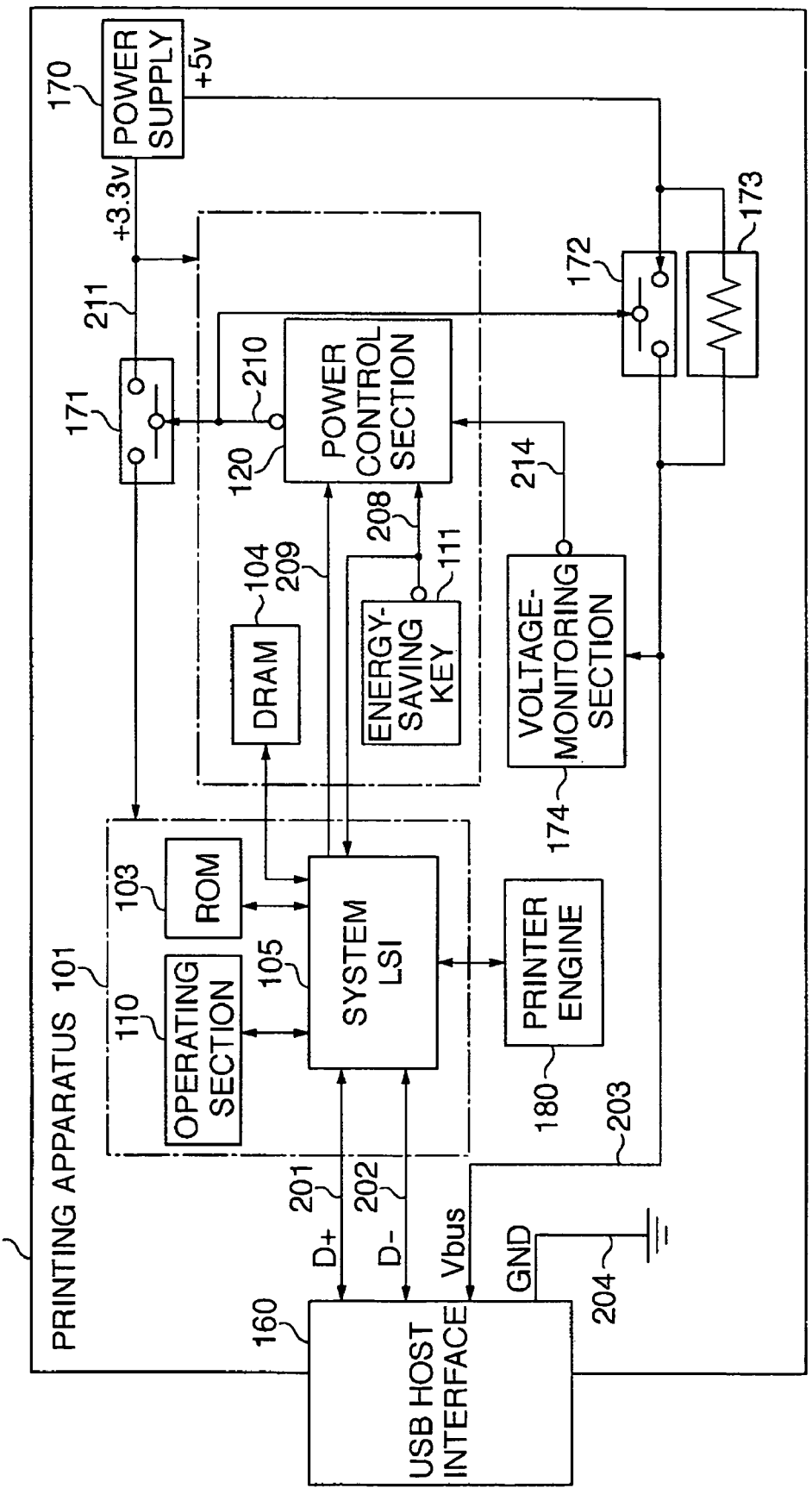
FIG. 1 is a block diagram of the internal configuration of a printing apparatus according to an embodiment of the present invention.

FIG. 1 is a block diagram of the internal configuration of an information processing apparatus according to the embodiment of the present invention.

Referring to FIG. 1, a printing apparatus 100 implementing the information processing apparatus according to the present embodiment operates in a normal operation mode in which printing and the like can be performed, or in an energy-saving mode in which power consumption is held low, and includes an energy-saving block 101 to which the supply of electric power is interrupted when the printing apparatus 100 is operating in the energy-saving mode. The energy-saving block 101 is comprised of a system LSI (Large Scale-Integrated circuit) 105, and a ROM (Read Only Memory) 103 and an operating section 110 which are connected to the system LSI 105.

The printing apparatus 100 is also provided with a DRAM (Dynamic Random Access Memory) 104 and a printer engine 180 which are connected to the system LSI 105.

The printing apparatus 100 further includes a power control section 120, an energy-saving key 111, a voltage-monitoring section 174, a USB (Universal Serial Bus) host interface 160 (communication unit), a power supply 170, FET (Field Effect Transistor) switches 171 and 172, and a resistor 173.

The power supply 170 supplies electric power to the energy-saving block 101 via a power supply line 211 at a voltage of 3.3 V, and at the same time supplies electric power to the USB host interface 160 via a Vbus (voltage bus) 203 at a voltage of 5 V. The FET switch 171 is provided on the power supply line 211, and the FET switch 172 and the resistor 173 are provided in the Vbus 203 in parallel with each other.

The USB host interface 160 is connected to the system LSI 105 via two data lines (D+ and D−) 201 and 202 so as to send and receive data to and from the system LSI 105. The USB host interface 160 is grounded via a ground wire (GND) 204. The USB host interface 160 is used for communication with a USB device, not shown, such as a USB memory.

Although not shown, the system LSI 105 includes a microprocessor that controls the overall operation of the printing apparatus 100, a ROM control section that performs access control of the DRAM 104, a USB control section that controls the USB host interface 160, an image rendering section that generates bitmap images, and a video interface section that converts image data rendered in the DRAM 104 into a serial video signal.

The ROM 103 stores program code executed by the microprocessor, font information, etc. The operating section 110 is used e.g. for configuring various settings associated with the printing apparatus 100. The DRAM 104 provides a work area for the microprocessor and stores image data.

The energy-saving key 111 is used by the user for switching between the energy-saving mode and the normal operation mode, and outputs an energy-saving key-dependent returning signal via a signal line 208 to the power control section 120. The voltage-monitoring section 174 monitors the voltage of the Vbus 203. When the voltage of the Vbus 203 drops, the voltage-monitoring section 174 outputs a USB-dependent returning signal to the power control section 120 via a signal line 214.

The power control section 120 outputs a power supply control signal to the FET switches 171 and 172 via a signal line 210 to perform ON/OFF control of the FET switches 171 and 172, thereby controlling the supply of electric power to the energy-saving block 101 and the USB host interface 160. The FET switches 171 and 172 are turned off when the power supply control signal input via the signal line 210 is at high level, and turned on when the power supply control signal input via the signal line 210 is at low level.

When the FET switches 171 and 172 are turned on, the printing apparatus 100 operates in the normal operation mode in which printing and the like can be performed, whereas when the FET switches 171 and 172 are turned off, the printing apparatus 100 operates in the energy-saving mode in which power consumption is held low.

Figure 2:
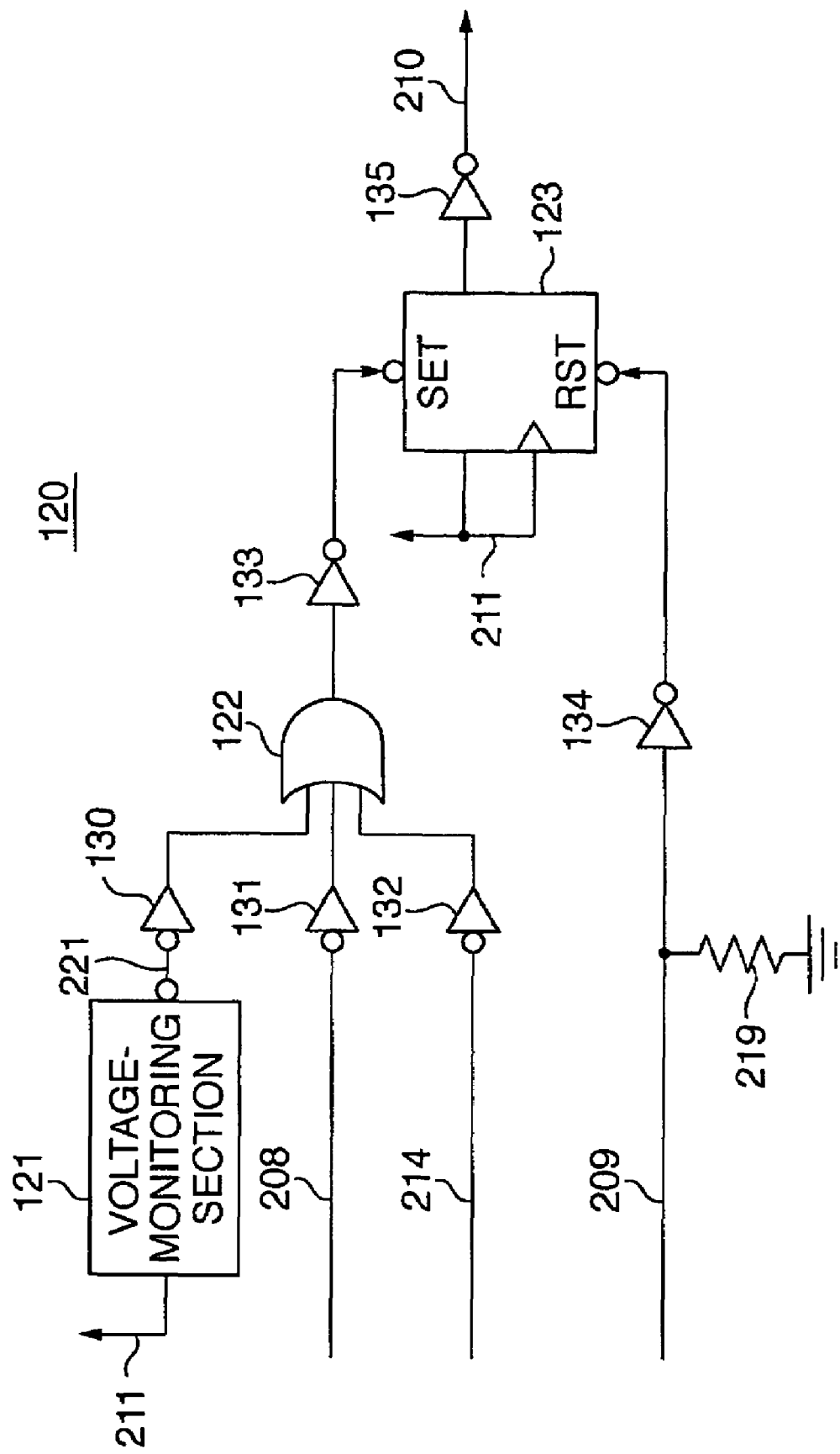
FIG. 2 is a block diagram of the internal configuration of a power control section appearing in FIG. 1.

FIG. 2 is a block diagram of the internal configuration of the power control section 120 in FIG. 1.

As shown in FIG. 2, the power control section 120 is comprised of a voltage-monitoring section 121, an OR circuit 122, a flip-flop 123, inverter circuits 130, 131, 132, 133, 134, and 135, and a pull-down resistor 219.

The flip-flop 123 performs switching of the printing apparatus 100 between the normal operation mode and the energy-saving mode, and holds its state corresponding to the operation mode to which the printing apparatus 100 is switched. The voltage-monitoring section 121 detects the ON/OFF of the power supply 170 by monitoring the voltage of the power supply line 211, and outputs a reset signal via a signal line 221 to the inverter circuit 130. Also, the energy-saving key-dependent return signal from the energy saving key 111 is input to the inverter circuit 131 via the signal 208. Further, the USB-dependent return signal from the voltage monitoring section 174 is input to the inverter circuit 132 via the signal line 214. When the microprocessor of the system LSI 105 has continued to be idle over a predetermined time period, it outputs a power supply-interrupting signal via a signal line 209 to the inverter circuit 134, so as to reduce power consumption.

The OR circuit 122 determines a logical sum of signals indicative of conditions for shifting from the energy-saving mode to the normal operation mode. More specifically, the inverter circuits 130, 131, and 132, to which are input the reset signal from the voltage monitoring section 121 of the voltage control section 120, the energy-saving key-dependent return signal from the energy saving key 111, and the USB-dependent return signal from the voltage monitoring section 174, output respective output signals which are formed by inverting the signals input thereto and are indicative of the shifting conditions, to the OR circuit 122. The OR circuit 122 outputs a signal indicative of the logical sum of these signals indicative of the shifting conditions to the inverter circuit 133. The inverter circuit 133 inverts the signal indicative of the logical sum of the signals indicative of the shifting conditions and inputs the inverted signal to a SET terminal of the flip-flop 123. On the other hand, the output from the inverter circuit 134 to which is input the power supply-interrupting signal via the signal line 209 is input to a RST terminal of the flip-flop 123. The output from the flip-flop 123 is input to the inverter circuit 135, and the output from the inverter circuit 135 is delivered via the signal line 210 to the FET switches 171 and 172 as the power supply control signal to perform ON/OFF control thereof. The pull-down resistor 219 stabilizes the level of the power supply-interrupting signal input via the signal line 209 to the inverter circuit 134, when the supply of electric power to the system LSI 105 is interrupted.

Figure 3:
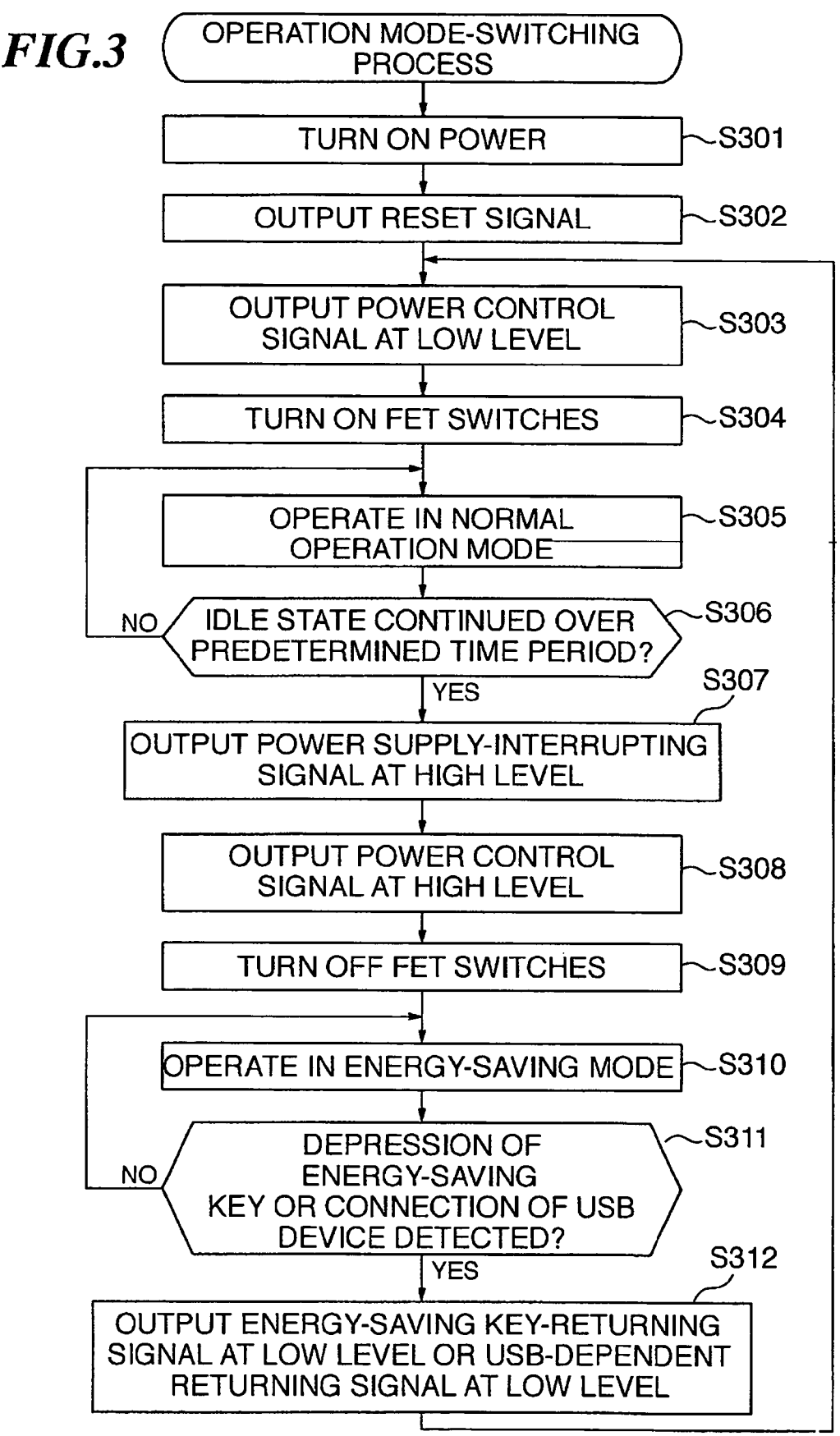
FIG. 3 is a flowchart of an operation mode-switching process which is executed by a microprocessor of the printing apparatus shown in FIG. 1.

FIG. 3 is a flowchart of an operation mode-switching process which is executed by the microprocessor of the printing apparatus 100 in FIG. 1.

As shown in FIG. 3, when the power supply 170 of the printing apparatus 100 is turned on (step S301), the voltage-monitoring section 121 of the power control section 120 continuously outputs the reset signal via the signal line 221 to the inverter circuit 130 over a predetermined time period after the voltage level of the power supply line 211 reaches a predetermined value (step S302). When the reset signal is input via the signal line 221 to the inverter circuit 130, the flip-flop 123 of the power control section 120 is set to a status for establishing the normal operation mode of the printing apparatus 100, and the power control section 120 outputs the power supply control signal at low level via the signal line 210 to the FET switches 171 and 172 (step S303). When the power supply control signal at low level is input, the FET switches 171 and 172 are turned on (step S304).

When the FET switches 171 and 172 are turned on, electric power is supplied from the power supply 170 to the energy-saving block 101 to activate the microprocessor of the system LSI 105, whereby the printing apparatus 100 starts operating in the normal operation mode in which printing and the like can be performed (step S305).

When the microprocessor of the system LSI 105 has continued to be idle over the predetermined time period (YES to a step S306), it outputs the power supply-interrupting signal at high level to the inverter circuit 134 of the voltage control section 120 via the signal line 209 (step S307). When the power supply-interrupting signal at high level is input via the signal line 209 to the inerter circuit 134, the flip-flop 123 is reset to a status for establishing the energy-saving mode of the printing apparatus 100, and the power control section 120 outputs the power supply control signal at high level to the FET switches 171 and 172 via the signal line 210 (step S308).

When the power supply control signal at high level is input via the signal line 210, the FET switches 171 and 172 are turned off (step S309). When the FET switches 171 and 172 are turned off, the supply of electric power from the power supply 170 to the energy-saving block 101 is interrupted, and at the same time the printing apparatus 100 shifts to a state where electric power can be supplied to the USB host interface 160 from the power supply 170 via the resistor 173, and starts operating in the energy-saving mode in which power consumption is held low (step S310). That is, in a state where a USB device is not connected to the USB host interface 160, voltage is applied to the USB host interface 160, but the flow of electric current is interrupted.

Then, when depression of the energy-saving key 111 by the user or connection of a USB device to the USB host interface 160 is detected (step S311) (detection step), the energy-saving key 111 or the USB host interface 160 outputs the energy-saving key-dependent returning signal at low level to the inverter circuit 131 of the power control section 120 via the signal line 208 or the USB-dependent returning signal at low level to the inverter circuit 132 of the power control section 120 via the signal line 214 (step S312), followed by the process returning to the step S303.

When the USB-dependent returning signal is input via the signal line 214 to the inverter circuit 132, the flip-flop 123 of the power control section 120 is set to the status for establishing the normal operation mode of the printing apparatus 100, and the power control section 120 outputs the power supply control signal at low level via the signal line 210 (step S303), whereby the FET switches 171 and 172 are turned on (step S304) (power control step). When the FET switches 171 and 172 are turned on, electric power is supplied from the power supply 170 to the energy-saving block 101, and at the same time electric power is supplied to the USB host interface 160 from the power supply 170 through the FET switch 172, whereby the printing apparatus 100 shifts to the normal operation mode (step S305).

According to the process shown in FIG. 3, when connection of a USB device to the USB host interface 160 is detected (step S311), the USB host interface 160 outputs the USB-dependent returning signal at low level via the signal line 214 to the inverter circuit 132 of the power control section 120 (step S312), so that the operability of the printing apparatus 100 can be improved.

Now, a method of detecting connection of a USB device to the USB host interface 160 in the step S311 will be described with reference to a flowchart in FIG. 4.

Figure 4:
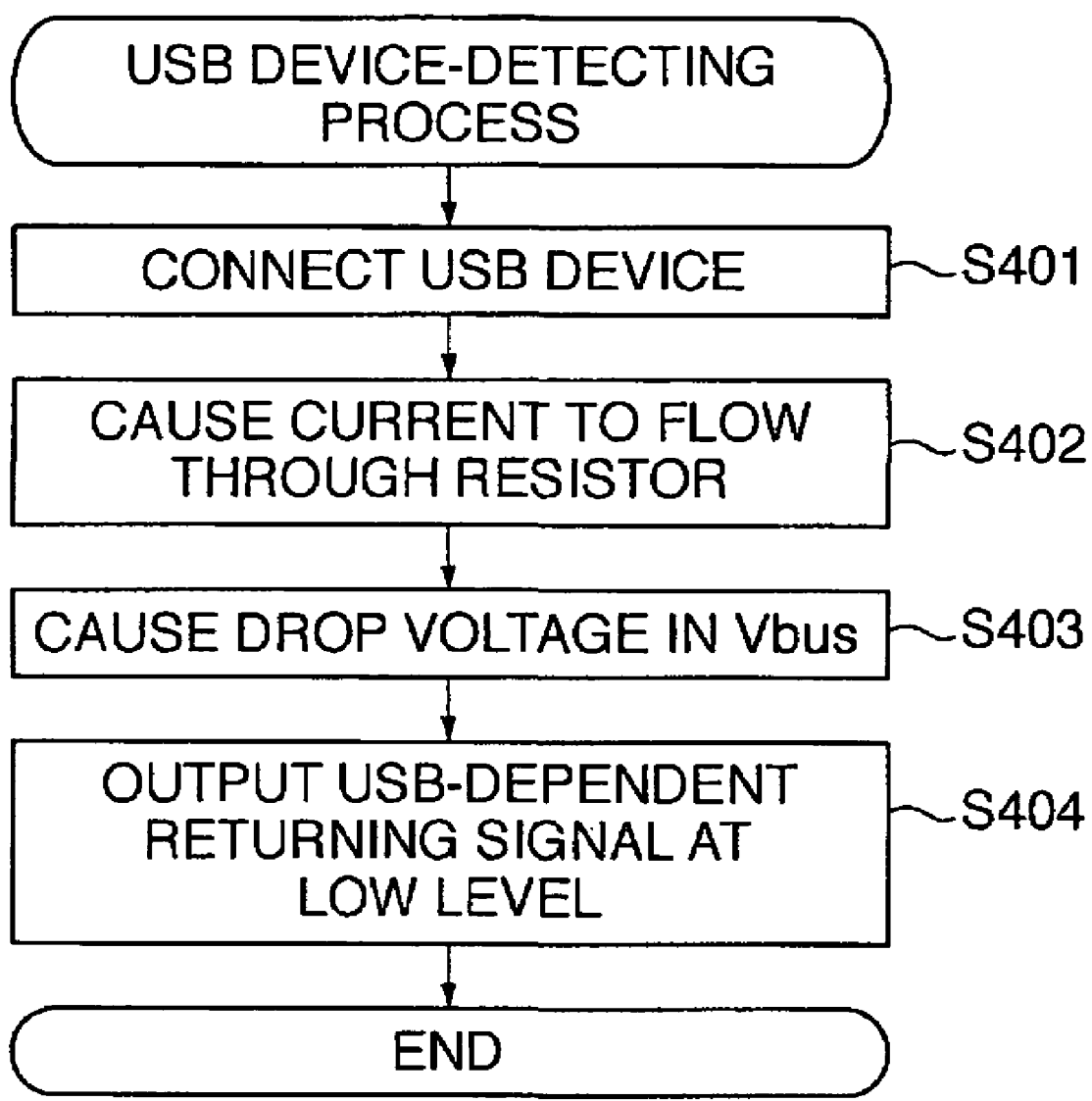
FIG. 4 is a flowchart of a USB device-detecting process which is executed in a step S311 in FIG. 3.

FIG. 4 is a flowchart of a USB device-detecting process which is executed in the step S311 in FIG. 3.

As shown in FIG. 4, when a USB device, such as a USB memory, is connected to the USB host interface 160 by the user during operation of the printing apparatus 100 in the energy-saving mode (step S401), in which the FET switch 172 is off, an electric current flows into the USB device from the power supply 170 through the resistor 173 (step S402).

Then, the voltage of the Vbus 203, which is normally held at 5 V, is caused to drop by the resistor 173 (step S403). When a voltage drop in the Vbus 203 is detected, the voltage-monitoring section 174 outputs the USB-dependent returning signal at low level to the inverter circuit 132 of the power control circuit 120 via the signal line 214 (step S404), followed by terminating the present process.

According to the process shown in FIG. 4, since the voltage-monitoring section 174 outputs the USB-dependent returning signal at low level via the signal line 214 to the inverter circuit 132 of the power control section 120 when the voltage drop in the Vbus 203 is detected (step S404), the printing apparatus 100 is capable of detecting the connection of the USB device to the USB host interface 160 to shift from the energy-saving mode to the normal operation mode.

Next, an operation that is performed by the printing apparatus 100 after detecting connection of a USB device to the USB host interface 160 and shifting from the energy-saving mode to the normal operation mode, will be described with reference to FIG. 5.

Figure 5:
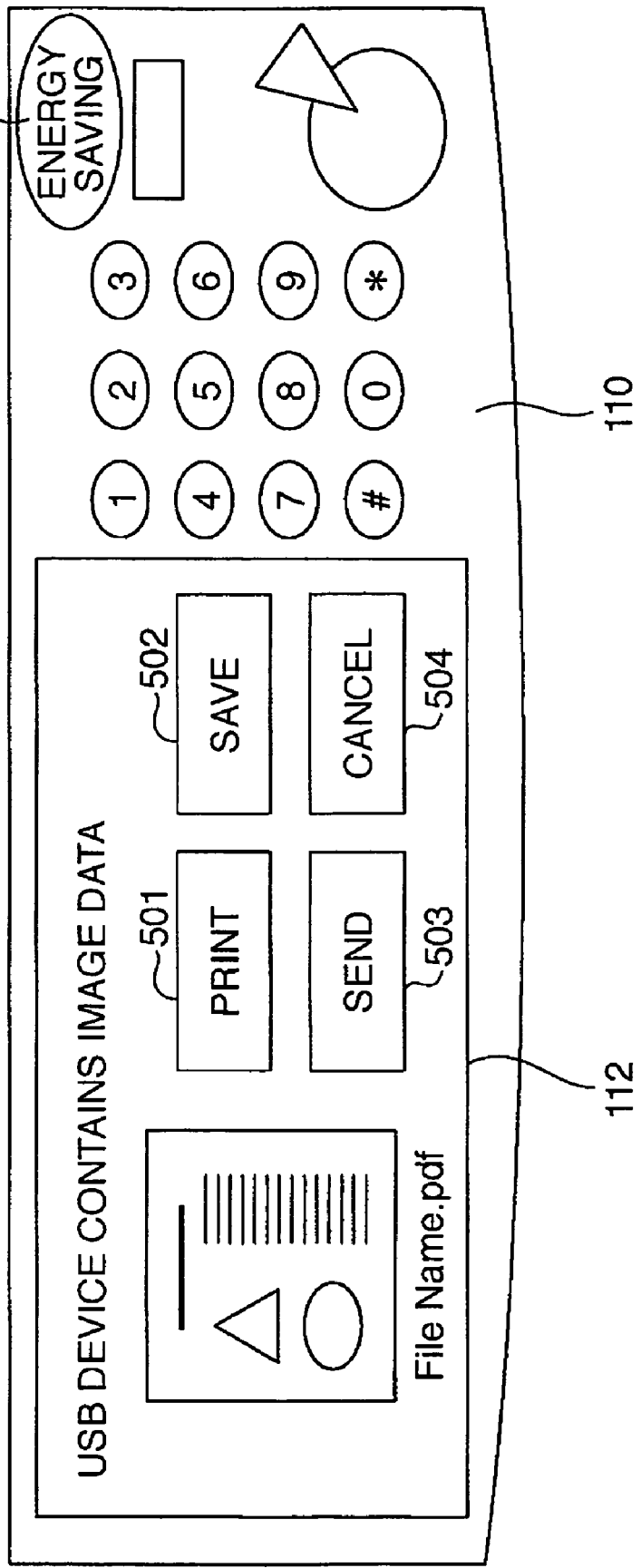
FIG. 5 is a view showing an example of a display screen of an operating section appearing in FIG. 1.

FIG. 5 is a view showing an example of a display screen which is displayed on the operating section 110 appearing in FIG. 1, when the USB device is connected to the USB host interface 160.

As shown in FIG. 5, the operating section 110 is provided with a display section 112.

When the printing apparatus 100 detects the connection of the USB device to the USB host interface 160 and shifts from the energy-saving mode to the normal operation mode, the microprocessor in the system LSI 105 accesses the USB device connected to the USB host interface 160 and determines whether or not image data is stored in the USB device.

If image data is stored in the USB device, the microprocessor causes the display section 112 to display a selection screen for enabling the user to select a process to be executed for the image data stored in the USB device.

On the selection screen displayed on the display section 112, there are displayed a print button 501, a storage button 502, a send button 503, and a cancel button 504. Now, if the print button 501 is pressed, the printing apparatus 100 prints out the image data stored in the USB device. If the storage button 502 is pressed, the printing apparatus 100 stores the image data stored in the USB device in a storage device, such as a hard disk, therein. If the send button 503 is pressed, the printing apparatus 100 sends the image data stored in the USB device to a personal computer or the like on a network by e-mail or to a FAX machine or the like by FAX transmission. If the cancel button 504 is pressed, the printing apparatus 100 terminates the display of the selection screen.

Further, although not shown, when a plurality of pieces of image data are stored in the USB device, there is displayed a screen for prompting the user to select a piece of image data to be processed, or a screen for giving an instruction for processing all the pieces of image data.

When the USB device has image data stored therein, the microprocessor of the system LSI 105 causes the display section 112 to display the selection screen, shown in FIG. 5, for enabling the user to select a process to be executed on the image data stored in the USB device, so that when connection of the USB device to the USB host interface 160 is established, processing, such as printing, can be immediately performed on the image data stored in the USB device, which makes it possible to further improve the operability of the printing apparatus 100.

Although in the present embodiment, when depression of the energy-saving key 111 by the user or connection of a USB device to the USB host interface 160 is detected, the printing apparatus 100 is shifted from the energy-saving mode to the normal operation mode, this is not limitative, but the printing apparatus 100 may be configured to shift from the energy-saving mode to the normal operation mode along with an alarm given by a timer IC. In this case, the timer IC may be set, for example, such that the printing apparatus 100 shifts from the energy-saving mode to the normal operation mode at nine o'clock every morning. Alternatively, the printing apparatus 100 may be configured to shift from the energy-saving mode to the normal operation mode whenever information is received from an external apparatus via a network.

Further, although in the present embodiment, when the microprocessor of the system LSI 105 has continued to be idle over the predetermined time period, the printing apparatus 100 shifts from the normal operation mode to the energy-saving mode, this is not limitative, either, but the printing apparatus 100 may be configured to be switched from the normal operation mode to the energy-saving mode by control performed using a remote UI from an external apparatus connected to the printing apparatus 100 via a network, or alternatively it may be configured to shift from the normal operation mode to the energy-saving mode at a predetermined time e.g. at eight o'clock every evening.

Further, the communication unit is not limited to the USB host interface 160, but another type of interface, such as an IEEE 1394 interface, may be used.

Although in the above described embodiment, the microprocessor is incorporated in the system LSI to form a systemon-chip LSI, the microprocessor may be configured to be provided independently of, i.e. separately from the system LSI. Similarly, the USB control section may be configured to be provided independently of, i.e. separately from the system LSI.

Further, it is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

The above program has only to realize the functions of the above described embodiment on a computer, and the form of the program may be an object code, a program code executed by an interpreter, or script data supplied to an OS.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board provided into a computer or a memory provided in an expansion unit connected to the computer and then causing a CPU or the like provided in the expansion board or the expansion unit to perform a part or all of the actual operations based on instructions of the program code.

This application claims the benefit of Japanese Application No. 2005-154022, filed May 26, 2005, which is hereby incorporated by reference herein in its entirety.

What is claimed is:

1. An information processing apparatus that operates in a normal operation state or in an energy-saving state in which power consumption is lower than that in the normal operation state, comprising:
   a communication unit configured to communicate with an external device;
   a voltage supply unit configured to supply voltage to said communication unit, the voltage supplied by said voltage supply unit being supplied from said communication unit to the external device;
   a control unit configured to control the voltage supplied by said voltage supply unit to said communication unit through a resistor in a case where the information processing apparatus is operating in the energy-saving state, and control the voltage supplied by said voltage supply unit to said communication unit without using the resistor in a case where the information processing apparatus is operating in the normal operation state; and
   a detecting unit configured to detect a voltage drop in response to connection of the external device to said communication unit when said voltage supply unit supplies the voltage to said communication unit through the resistor,
   wherein said control unit is further configured to control the information processing apparatus to shift from the energy-saving state to the normal operation state in a case where said detecting unit detects the voltage drop.

2. The information processing apparatus as claimed in claim 1, further comprising a printing unit configured to print out data stored in the external device when the external device is connected to said communication unit.

3. The information processing apparatus as claimed in claim 1, further comprising a storage unit configured to store data stored in the external device when the external device is connected to said communication unit.

4. The information processing apparatus as claimed in claim 1, further comprising a transmission unit configured to transmit data stored in the external device to another apparatus when the external device is connected to said communication unit.

5. The information processing apparatus as claimed in claim 1, wherein said communication unit is a host interface of a universal serial bus (USB).

6. The information processing apparatus as claimed in claim 5, wherein the external device is a USB memory.

7. The information processing apparatus as claimed in claim 1, wherein said communication unit is an IEEE 1394 interface.

8. The information processing apparatus as claimed in claim 1, further comprising a display unit configured to display information on data stored in the external device when the external device is connected to said communication unit.

9. The information processing apparatus as claimed in claim 8, wherein the information on data stored in the external device is for selecting a process to be performed on the data.

10. The information processing apparatus as claimed in claim 9, wherein the process to be performed includes printing of the data by a printing unit, storage of the data by a storage unit, and transmission of the data to another apparatus by a transmission unit.

11. A method of controlling an information processing apparatus that operates in a normal operation state or in an energy-saving state in which power consumption is lower than that in the normal operation state, and comprises a communication unit configured to communicate with an external device, and a voltage supply unit configured to supply voltage to said communication unit, the voltage supplied by said voltage supply unit being supplied from said communication unit to the external device, the method comprising the steps of:
   supplying the voltage supplied by said voltage supply unit to said communication unit through a resistor in a case where the information processing apparatus is operating in the energy-saving state;
   supplying the voltage supplied by said voltage supply unit to said communication unit without using the resistor in a case where the information processing apparatus is operating in the normal operation state; and
   detecting a voltage drop in response to connection of the external device to said communication unit when said voltage supply unit supplies the voltage to said communication unit through the resistor, controlling the information processing apparatus to shift from the energy-saving state to the normal operation state in a case where the detecting step detects the voltage drop.

12. A storage medium storing a computer program executable by a computer for controlling an information processing apparatus that operates in a normal operation state or in an energy-saving state in which power consumption is lower than that in the normal operation state, and comprises a communication unit configured to communicate with an external device, and a voltage supply unit configured to supply voltage to said communication unit, the voltage supplied by said voltage supply unit being supplied from said communication unit to the external device, the program comprising:

a control module configured to supply the voltage supplied by said voltage supply unit to said communication unit through a resistor in a case where the information processing apparatus is operating in the energy-saving state, and to supply the voltage supplied by said voltage supply unit to said communication unit without using the resistor in a case where the information processing apparatus is operating in the normal operation state; and a detecting module configured to detect a voltage drop in response to connection of the external device to said communication unit when said voltage supply unit supplies the voltage to said communication unit through the resistor, wherein said control module is further configured to control the information processing apparatus to shift from the energy-saving state to the normal operation state in a case where the detecting module detects the voltage drop.

* * * * *